United States Patent
Yokota

[19]

[11] Patent Number: 5,806,001
[45] Date of Patent: Sep. 8, 1998

[54] RADIO BASE STATION FOR OFFSET PHASE TRANSMISSION

[75] Inventor: Tomoyoshi Yokota, Yokohama, Japan

[73] Assignee: Kyocera Corporation, Kyoto, Japan

[21] Appl. No.: 753,192

[22] Filed: Nov. 21, 1996

[30] Foreign Application Priority Data

Dec. 28, 1995 [JP] Japan ................................ 7-342550

[51] Int. Cl.⁶ ............................................. H04B 7/00
[52] U.S. Cl. .................... 455/507; 455/524; 455/561; 455/562
[58] Field of Search ............................... 455/33.3, 53.1, 455/54.1, 56.1, 62, 63, 68, 60, 51.1, 51.2, 502, 503, 517, 510, 507, 524, 561, 562, 101, 103, 506; 379/59; 370/337, 347; 375/267, 299, 347, 247

[56] References Cited

U.S. PATENT DOCUMENTS

| | | | |
|---|---|---|---|
| 3,979,754 | 9/1976 | Archer . | |
| 4,128,740 | 12/1978 | Graziano . | |
| 4,470,141 | 9/1984 | Takada .................................. | 455/51.1 |
| 4,489,325 | 12/1984 | Bauck et al. . | |
| 4,626,858 | 12/1986 | Copeland . | |
| 5,061,937 | 10/1991 | Ozeki et al. ............................. | 342/372 |
| 5,062,124 | 10/1991 | Hayashi et al. ......................... | 455/51.1 |
| 5,077,759 | 12/1991 | Nakahara ................................. | 455/51.1 |
| 5,212,689 | 5/1993 | Eriksson ................................. | 455/101 |
| 5,347,535 | 9/1994 | Karasawa et al. ....................... | 455/506 |
| 5,511,233 | 4/1996 | Otten ....................................... | 455/33.1 |
| 5,528,597 | 6/1996 | Gerszberg et al. ....................... | 455/51.1 |
| 5,561,850 | 10/1996 | Makitalo et al. ....................... | 455/506 |
| 5,602,555 | 2/1997 | Searle et al. ............................ | 455/53.1 |
| 5,603,089 | 2/1997 | Searle et al. ............................ | 455/53.1 |

FOREIGN PATENT DOCUMENTS

| | | | |
|---|---|---|---|
| 322632 | 1/1991 | Japan . | |
| 0239019 | 10/1991 | Japan ..................................... | 455/101 |
| 465928 | 3/1992 | Japan . | |
| 5102904 | 4/1993 | Japan . | |
| 62-32621 | 8/1994 | Japan . | |
| 7263945 | 10/1995 | Japan . | |

*Primary Examiner*—Jacques H. Louis-Jacques
*Assistant Examiner*—Gertrude Arthur
*Attorney, Agent, or Firm*—Loeb & Loeb LLP

[57] ABSTRACT

A radio base station of a portable telephone system designed so as to establish a service area by transmission of radio waves so that radio communication is performed with a plurality of mobile stations existing in the service area, the radio base station comprising a plurality of antennas and control means for controlling transmission of a control data signal, which is to be time-divisionally transmitted at a predetermined interval, in a manner so as to transmit the control data signal by using the plurality of antennas into a plurality of directions in each of which a radiation beam of each antenna is made narrow to give directivity and in a condition that offset is given in transmission to the respective directions so as to transmit the control data signal into the directions in phases different from each other. Preferably, the offset for the respective directions is set to be N/m (msec.), where N (msec.) represents the predetermined interval and m represents the number of the plurality of directions.

9 Claims, 2 Drawing Sheets

RADIO BASE STATION FOR OFFSET PHASE TRANSMISSION

BACKGROUND OF THE INVENTION

The present invention relates to a portable telephone system.

In a portable telephone system, conventionally, a radio base station transmits control data at predetermined intervals time-divisionally to thereby perform radio communication with a plurality of mobile stations existing in a service area. In the case of transmission, data are omni-directionally sent through only one antenna. In the case of reception, on the contrary, diversity reception is performed by using a plurality of antennas.

In the conventional omni-directional transmission of control data, however, transmission energy is dispersed so that the radius of a communicable zone is limited. It is therefore necessary to use a large-output power amplifier, but such a large-output power amplifier is expensive.

Further, a plurality of antennas are used for diversity reception in a reception system while only one antenna is used in a transmission system. Thus, transmission is performed with an antenna pattern different from that in reception. Therefore, the antenna pattern is sometimes unbalanced between transmission and reception.

SUMMARY OF THE INVENTION

An object of the present invention is therefore to solve the foregoing problems to provide a radio base station of a portable telephone system which is balanced between transmission and reception, which is improved in talk quality, etc.

In order to attain the above object, according to the present invention, in a radio base station of a portable telephone system having a plurality of antennas and being designed so as to establish a service area by transmission of radio waves so that radio communication is performed with a plurality of mobile stations existing in the service area, there is provided control means for controlling transmission of a control data signal, which is to be time-divisionally transmitted at a predetermined interval, in a manner so as to transmit the control data signal by using the plurality of antennas into a plurality of directions in each of which a radiation beam of each antenna is made narrow to give directivity and in a condition that offset is given in transmission to the respective directions so as to transmit the control data signal into the directions in phases different from each other.

Preferably, the offset for the respective directions is set to be N/m (milli-second), where N (milli-second) represents the predetermined interval and m represents the number of the plurality of directions.

BRIEF DESCRIPTION OF DRAWINGS

FIGS. 1A and 1B are views for explaining the principle of the present invention, in which FIG. 1A is an image diagram showing zones A to D of a radio base station having n antennas which receive control data and FIG. 1B is a timing chart showing the transmitting timing of the control data in the respective directions of the zones A to D.

DETAILED DESCRIPTION OF THE PREFERRED EMBODIMENT

In an embodiment of the present invention, the radio base station of a portable telephone system has a plurality of (n in number) antennas and is designed so as to establish a service area by transmission of radio waves so that radio communication is performed with a plurality of mobile stations existing in the service area. The radio base station is provided with control means for controlling transmission of a control data signal, which is to be time-divisionally transmitted at a predetermined interval, that is, N [msec], in a manner so as to transmit the control data signal by using the n antennas into a plurality of directions, that is, m directions, in each of which a radiation beam of each antenna is made narrow to give directivity and in a condition that offset of N/m [msec] is given in transmission to the respective m directions so as to transmit the control data signal into the m directions in phases different from each other.

That is, in the base station of the portable telephone system having n antennas, control data are transmitted not omni-directionally by using the n antennas but time-divisionally with directivities in the m directions which are obtained by narrowing the radiation beams of the n antennas. At this time, when the intermittent transmission interval of the control data is selected to be N [msec], the offset of N/m [msec] is given in transmission to the respective antennas so that the control data are transmitted with the directivities.

For example, in a digital portable telephone system, a base station intermittently transmits control data to extension terminals at a predetermined interval of N [msec]. When the base station is constituted by n antennas, the phase of the signal to be supplied to the respective n antennas is controlled with an offset of N/m [msec] given to the respective n antennas so that the beams are narrowed in the desired m directions and the control data are transmitted at an interval of N [msec]. At this time, transmission is performed in the state where directivities are given to the respective directions with the transmission energy condensed in the respective directions so that the control data reaching area can be spread. Further, since the radiation beams are narrowed in talk in transmission as well as reception, the service area can be spread.

In order to simplify explanation, description will be made below as to a case where the radiation beams are narrowed in four directions (that is, m=4) to form a control zone by using a plurality of (n in number) antennas. Although the number n of the antennas is not particularly limited, it is suitable to select the number n to be 4 correspondingly to the number of directions (m=4) in this case. Further, in this case, when diversity reception is performed by using the four antennas in the reception system, the antenna patterns coincide with each other in transmission as well as in reception so that transmission and reception are balanced with each other.

Figure 1A:
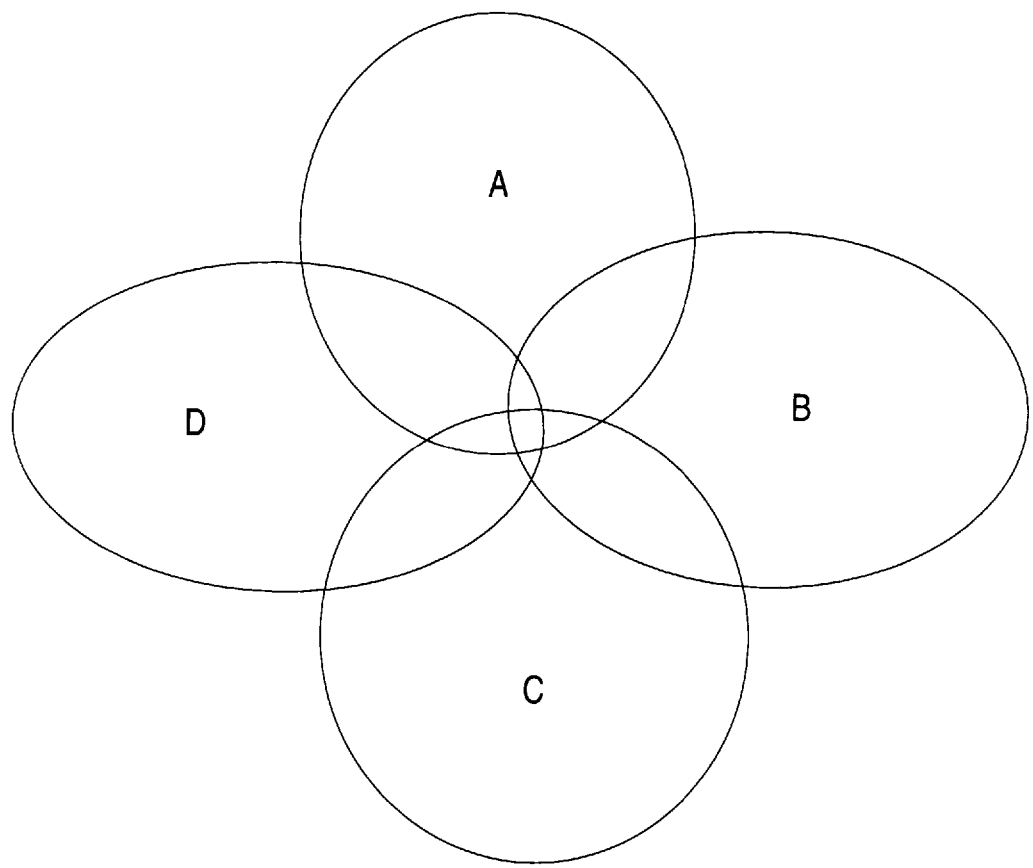
Figure 1B:
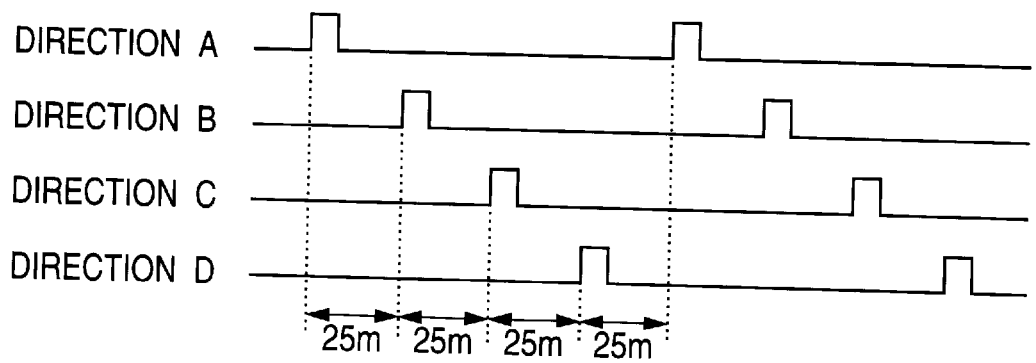

FIGS. 1A and 1B are views for explaining the principle of the present invention, in which FIG. 1A is an image diagram showing zones A to D of a radio base station having n antennas which transmit control data and FIG. 1B is a timing chart showing the transmission timing of the control data in the respective directions of the zones A to D. As shown in FIG. 1A, the respective radiation beams are narrowed to provide directivities in the four directions so as to form the four zones A to D to which the control data are transmitted. A radio base station is located in the center of the portion where the zones A to D are overlapped with one another. The shape and direction of each of the zones A to D can be changed by controlling the directivities of the respective antennas. The area of each of the zones A to D can be changed by controlling the output of the power amplifier of each antenna. Control of the directivity of the antenna and the power amplifier output can be performed by utilizing known techniques.

The phase of the control data to be supplied to the n antennas is controlled as shown in FIG. 1B so that the same control data are transmitted in the four directions of the zones A to D with the phase which is made different between the four directions. In this case, when the interval of the intermittent transmission is selected to be 100 [msec], the phase is made different with an offset of N/m=25 [msec] among the four directions.

Figure 2:
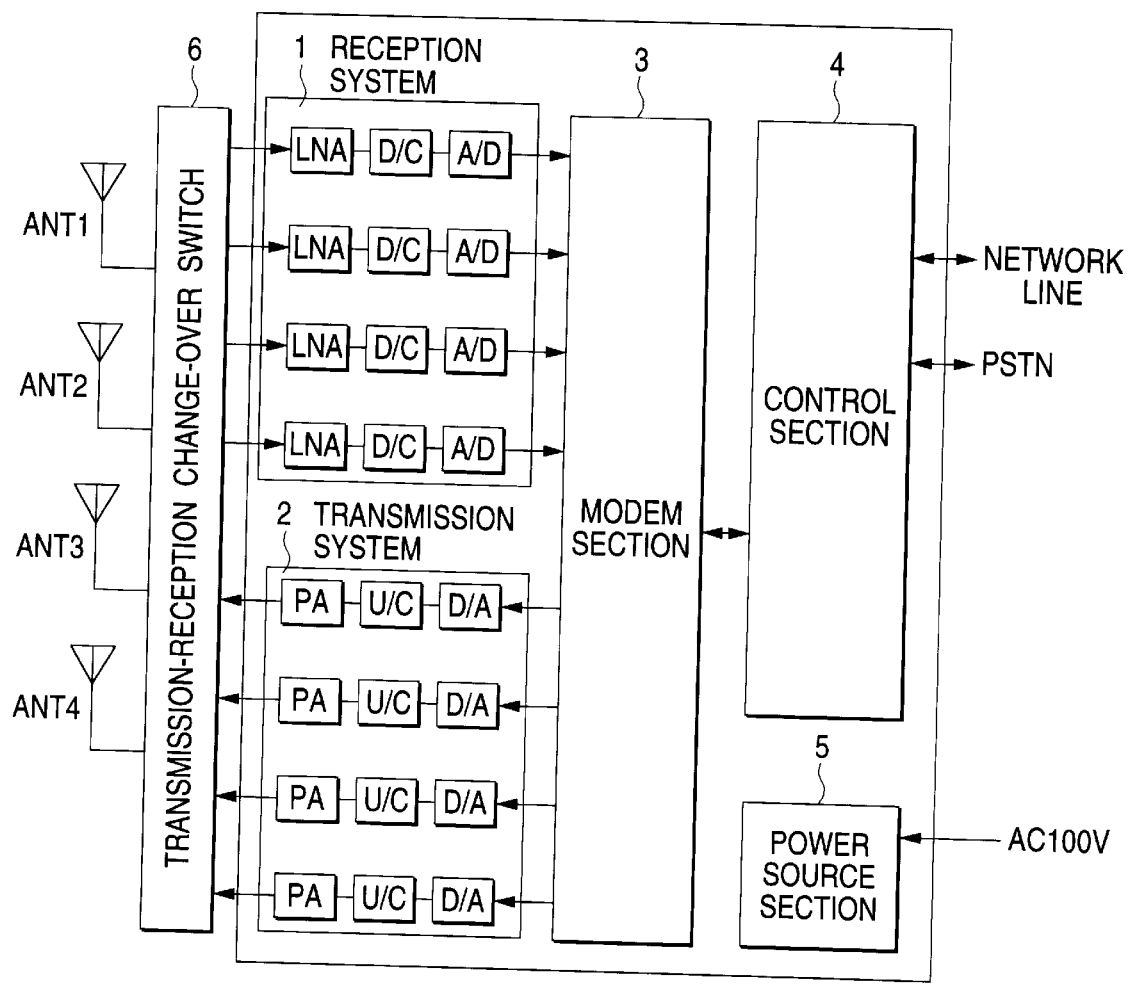
FIG. 2 is a diagram showing an embodiment of the radio base station of a digital portable telephone system using four antennas ANT1 to ANT4 according to the present invention.

FIG. 2 is a block diagram showing the configuration of a radio base station of a digital portable telephone system according to an embodiment of the present invention. The radio base station is provided with four antennas ANT1 to ANT4, and constituted by a reception system module 1, a transmission system module 2, a modem portion 3, a control portion 4, a power source portion 5, and a transmission-reception change-over switch 6.

Correspondingly to the respective four antennas ANT1 to ANT4, the reception system module 1 is constituted by four low-noise amplifiers LNA for amplifying received radio waves, four down-converters D/C for converting the frequencies of the input signals from the respective amplifiers LNA, and four analog-to-digital converters A/D for converting the input signals from the down converters D/C respectively into digital signals.

Correspondingly to the respective four antennas ANT1~ANT4, the transmission system module 2 is constituted by four digital-to-analog converters D/A for converting digital modulated-signals supplied from the modem portion 3 into analog signals respectively, four up-converters U/C for converting the frequencies of the thus obtained analog signals into transmission frequencies respectively, and four power amplifiers PA for amplifying the transmission power respectively.

The modem portion 3 is constituted by a plurality of CPUs so as to perform phase control by modulation/demodulation of transmission/reception data and by digital signal processing. The control operation of the modem portion 3 is performed in such a manner as follows. For example, composition and demodulation are performed on a digital signal converted on the final stage of the reception system module 1 so as to maximize the ratio D/U (that is, the ratio of the desired wave to the undesired wave(interference wave)) of the digital signal. Further, the phases of reception at each antenna is calculated and control is performed to make the phase at the antenna end identical with the phase of reception at the time of transmission. By this control operation, directivity toward an extension terminal is given for transmission as well as reception. Further, a null point is formed in the direction of arrival of interference and delay waves to thereby suppress those undesired waves. Moreover, the phase of a signal to be applied to each antenna is controlled to thereby give directivity in a desired direction so that transmission can be made in a state where the radiation beam is sufficiently narrowed. Furthermore, it is possible to reduce downward interference given to any other base stations and extension terminals other than the extension terminal with which the base station in question is talking or performing data exchange.

The control portion 4 is constituted by a plurality of CPUs so as to control the whole of the base station. The control operation of the control portion 4 is performed in such a manner as follows. The control portion 4 gives instructions as to necessary parameter and timing to the modem portion 3 and processes date received and modulated in the modem portion 3. Further, the control portion 4 generates data to be transmitted into the air and delivers the generated data to the modem portion 3. Particularly according to the present invention, the control portion 4 designates the value of N which represents the interval of intermittent transmission of the control data and the value of m which represents the number of directivities of the radiation beams to be provided. In the foregoing example of FIG. 1A, specifically, the control portion 4 gives designation to the modem portion 3 so that the number m of the directivities of the radiation beams is made equal to 4 to make the respective directivities of the zones A to D different by 90 degrees from one another, the radiation beams being narrowed in the directions of the directivities in the zones A to D respectively. The control portion 4 gives further designation to the modem portion 3 so that the interval time N of the intermittent transmission of the control data is made to be 100 [msec]. In this case, the control portion 4 supplies the control data to the modem portion 3 every 100 [msec]. The modem portion 3 performs directivity control and intermittent transmission control on each of the antennas on the bases of the interval N, the number n of the antennas, the number m of the beam directions, and the offset N/m. Further, the control portion 4 performs interface processing with respect to an ISDN (Integrated Services Digital Network) and a PSTN (Public Switched Telephone Network (analog)).

Next, the intermittent transmission control by the modem portion 3 will be described on the basis of the example of FIGS. 1 and 2. The modem portion 3 is constituted by a plurality of CPUs so as to function as a software timer with the intermittent transmission interval of 100 [msec] and the offset of 25 [msec] for the respective antenna on the basis of N=100 [msec] and m=4 directivities which are designated from the control portion 4. The modem portion 3 sends out the control data in the following procedure.

The modem portion 3 gives the control portion 4 a request for control data to be sent out and receives the control data from the control portion (Step 1).

Since the timing for sending out the control data is designated from the control portion 4, the modem portion 3 sends out the control data obtained in the above step 1 toward the zone A at the timing shown in the diagram of FIG. 1B. At the same time, the modem portion 3 starts software timers of 100 [msec] and 25 [msec]. (Step 2)

After the software timer of 25 [msec] is up (that is, after 25 [msec] from the sending-out of the control data in the direction of the zone A), the modem portion 3 sends out the same control data in the direction of the zone B as shown in the diagram FIG. 1B. At the same time, the modem portion 3 starts the software timer of 25 [msec]. (Step 3)

After the software timer of 25 [msec] is up (that is, after 25 [msec] from the sending-out of the control data in the direction of the zone B), the modem portion 3 sends out the same control data in the direction of the zone C as shown in the diagram of FIG. 1B. At the same time, the modem portion 3 starts the software timer of 25 [msec]. (Step 4)

After the software timer of 25 [msec] is up (that is, after 25 [msec] from the sending-out of the control data in the direction of the zone C), the modem portion 3 sends out the same control data in the direction of the zone D as shown in the diagram of FIG. 1B. At the same time, the modem portion 3 starts the software timer of 25 [msec]. (Step 5)

After the software timer of 100 [msec] is up, the modem portion 3 repeats the steps 1 to 5.

The present invention has the following effects.

When the control data are transmitted, the transmission is performed in the state where the directivity is given to thereby condense energy. Accordingly, the downward transmission is spread. Further, by suppression of the delay waves, the reception area can be spread. The service area can be spread, and when base stations are established in a location of light traffic, the number of base stations to be established can be reduced. Accordingly, the present invention is advantageous also in cost correspondingly.

Transmission can be performed with the same antenna pattern as that of the reception system. Accordingly, transmission and reception are balanced with each other because of the reversible property of the antenna. Consequently, the talk quality is improved.

Since the service area is spread, the number of times of hang-over can be reduced so as to contribute to an improvement of the talk quality.

Since substantially the same service area as the conventional one can be secured, an amplifier which is small in output, small in size and low in cost may be used for every antenna.

Since directivity can be given in transmission as well as reception, it is possible to reduce fading due to multi-path. At the same time, it is possible to suppress the delay waves. Accordingly, the diversity effect can be expected also in the control data to contribute to the improvement of the talk quality and the increase of the service area.

The transmission zone of the control data and the service area can be made identical with each other.

Directivity can be freely set. Accordingly, not only directivity can given to the direction toward an extension terminal, but also a null point can be given in the direction of interference waves while the directional peak is not directed toward the extension terminals so that the talk quality can be improved and the reduction of the service area due to the interference waves can be prevented.

What is claimed is:

1. A radio base station for transmitting radio waves and establishing radio communication with a plurality of mobile stations of a portable telephone system, the radio base station comprising:

control means for controlling transmission of a control data signal transmitted at a predetermined time interval;

plurality of antennas for transmitting the control data signal in a plurality of transmission directions; and means for controlling the transmission of the control data signal in each of the plurality of transmission directions so that the control data signal is transmitted in one of the plurality of transmission directions at a time which is offset relative to transmission of the control data signal in any other of the plurality of transmission directions, wherein the control data signal is transmitted in each of the plurality of transmission directions in phase which differ from each other.

2. The radio base station of claim 1, wherein

N is a number corresponding to the predetermined time interval in msec, m is a number corresponding to the plurality of transmission directions, and N/m is a ratio corresponding to the offset relative to transmission of the control data signal in any other of the plurality of transmission directions.

3. The radio base station of claim 2, wherein the control means generates a first control signal that is transmitted to each of the m transmission directions in a first sequence of m transmissions, and the control means generates a second control signal that is transmitted to each of the m transmission directions in a second sequence of m transmissions.

4. The radio base station of claim 3, wherein the offset is established by a software timer.

5. The radio base station of claim 3, further comprising:

a reception system coupled to the plurality of antennas, the reception system performing diversity reception using the plurality of antennas also used for transmitting control data.

6. The radio base station of claim 5, further comprising a switch coupled to the plurality of antennas, the plurality of antennas coupled through the switch to the reception system and to the means for controlling the transmission of the control data signal.

7. The radio base station of claim 5, wherein the reception system includes a separate amplifier coupled to each of the plurality of antennas.

8. The radio base station of claim 3, wherein the means for controlling the transmission of the control data signal includes a separate amplifier coupled to each of the plurality of antennas.

9. The radio base station of claim 3, wherein the control means generates a first control signal that is transmitted to each of the plurality of transmission directions in a first sequence, and the control means generates a second control signal that is transmitted to each of the plurality of transmission directions in a second sequence.

* * * * *